3,495,971
SMELTING FURNACE CHARGE COMPOSITION
AND METHOD OF MAKING SAME
Thomas E. Ban, Cleveland Heights, Ohio, assignor to McDowell-Wellman Engineering Company, a corporation of Ohio
Filed May 19, 1967, Ser. No. 639,727
Int. Cl. C21b 1/20; C21c 5/52
U.S. Cl. 75—3                                 4 Claims

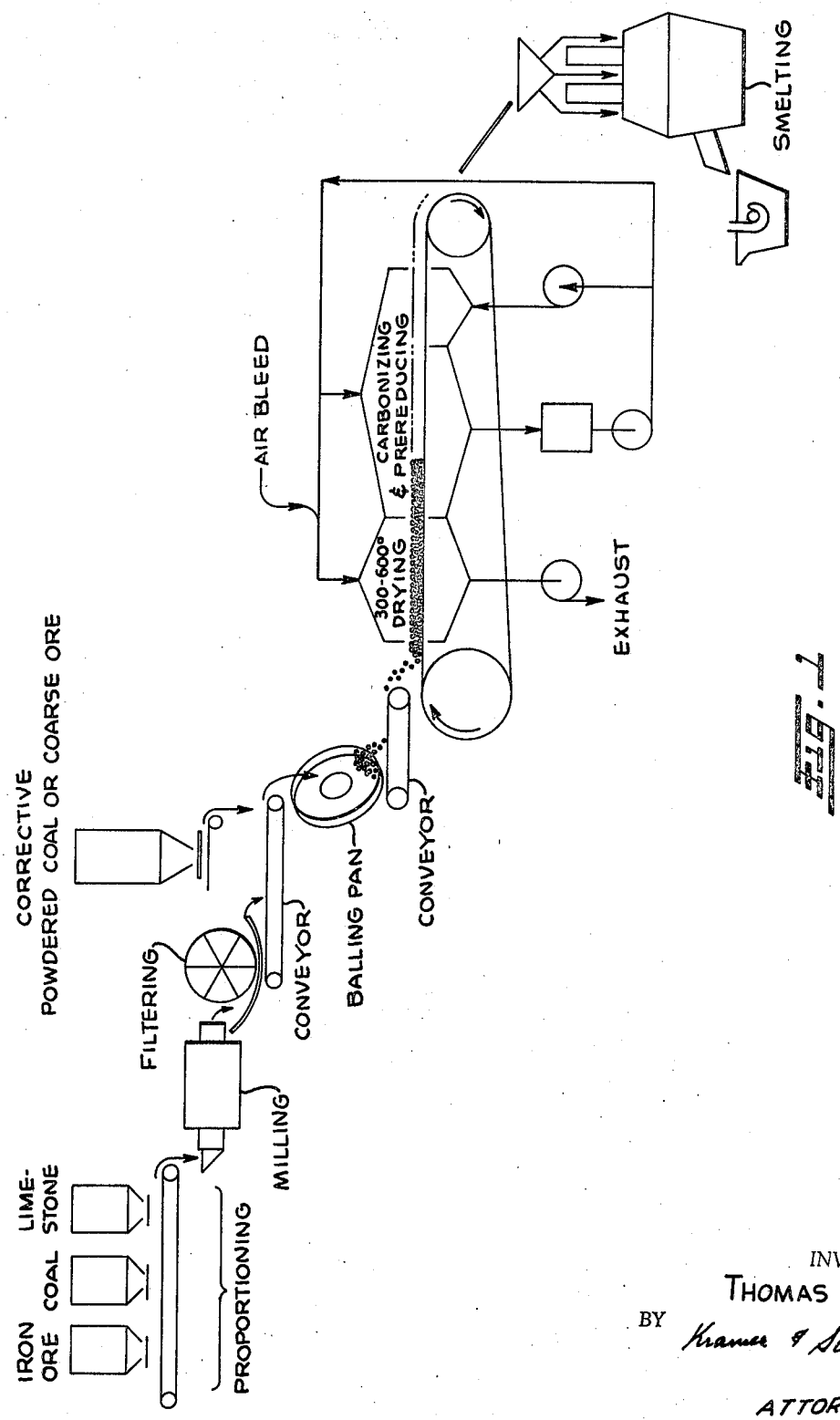

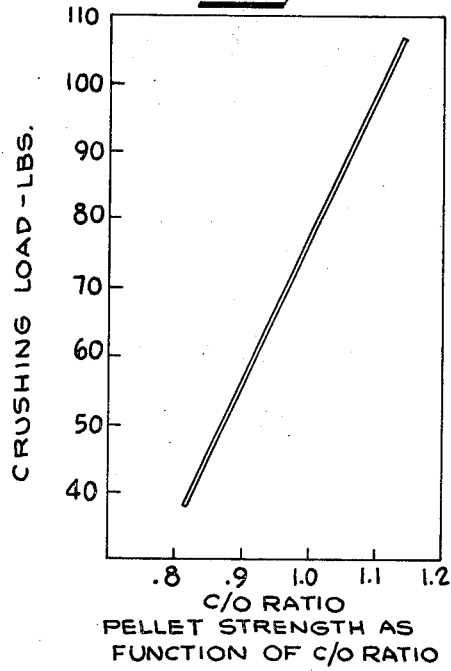
PELLET STRENGTH AS FUNCTION OF C/O RATIO
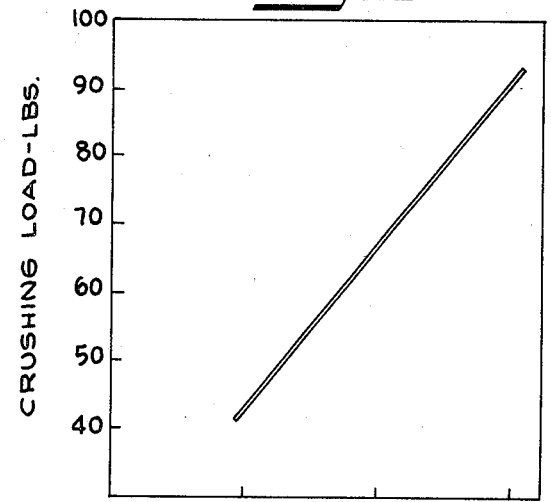
PELLET STRENGTH AS FUNCTION OF PERCENT COAL IN BURDEN
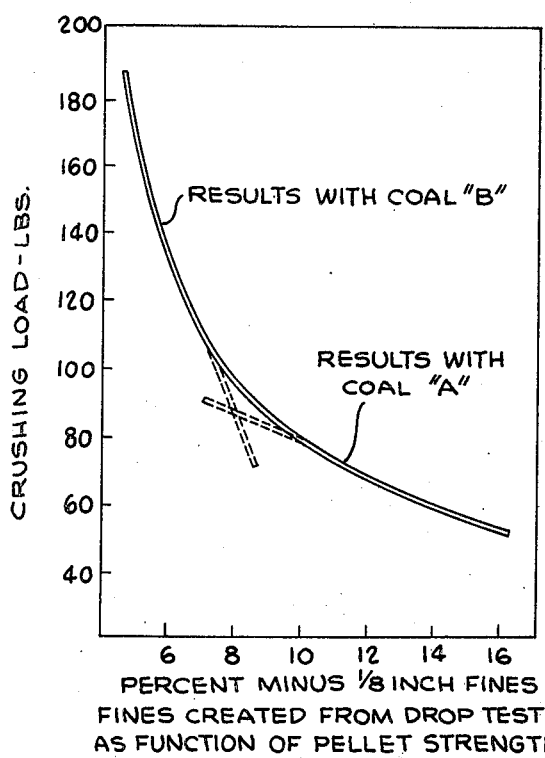
FINES CREATED FROM DROP TEST AS FUNCTION OF PELLET STRENGTH
Fig. 4
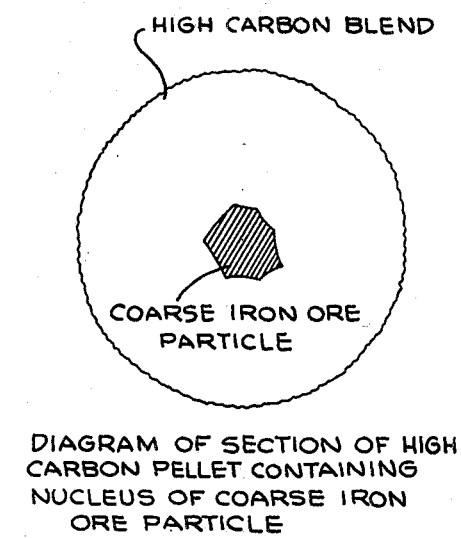
DIAGRAM OF SECTION OF HIGH CARBON PELLET CONTAINING NUCLEUS OF COARSE IRON ORE PARTICLE
Fig. 5
INVENTOR.
THOMAS E. BAN
BY
ATTORNEYS United States Patent Office 3,495,971
Patented Feb. 17, 1970

ABSTRACT OF THE DISCLOSURE

A charge composition for smelting furnaces including with relatively finely divided iron ore and solid carbonaceous material in pelletized form of high carbon/oxygen ratio, corrective coarse iron ore to yield a composite charge having the correct lower carbon/oxygen ratio for introduction into smelting furnaces.

---

This invention relates to the production of indurated iron ore charge composition which is particularly adapted for use in a smelting furnace. For use in smelting furnaces, indurated iron ore charge compositions must contain no more than a predetermined amount of free carbon which varies with the type of smelting process. However, charges containing such predetermined amounts of carbon are frequently too weak for handling. The present invention provides a composite including indurated pellet structures having the proper overall carbon content and also possessing adequate crushing strength prior to introduction into the smelting furnace. A preferred embodiment contemplates forming around a coarse particle size nucleus of iron ore, a high-carbon blend of iron ore solid carbonaceous material and limestone in which the overall carbon content with respect to the oxygen content in the charge is at the desired level.

The prior art method of producing iron from iron ore and a solid reducing agent by forming a mixture thereof into conglomerates or pellets, and treating these pellets under a forced draft of heated gas whereby the iron content is caused to become partially reduced is set forth in Patent 2,806,779. An improvement on the process is described in Patent 3,304,168. The production of highly metallized pellets is disclosed in Patent 3,264,092. The pellets from these prior art processes may be used in various smelting procedures to produce pig iron, such as the well known blast furnace process. Pellets produced in accordance with the teachings of the foregoing issued patents have also been used in carbon electrode, electric smelting furnaces. However, it has been found that in producing molten iron in an electric furnace from iron ore, carbon and limestone blends a problem is encountered when an excess of carbon occurs within the body of the electric furnace. When excess carbon accumulates in the furnace, it is found that the electrodes are gradually pushed out of the furnace and production efficiency is greatly impaired. One method of overcoming this difficulty with mixtures which are too rich in carbon for utilization by the electric smelting furnace, has been to correct the situation by throwing into the furnace an excess of iron ore to provide a means of utilizing the excess carbon and minimizing the problem with respect to elevation of the electrodes. This method of adjusting for excess carbon has not been entirely satisfactory since it is largely a matter of "eye balling" on the part of the operator to determine how much raw iron ore should be introduced to alleviate the problem of excess carbon.

It has now been found that the process of smelting, particularly in an electric furnace, can be greatly simplified by utilizing iron ore pellets and controlling the carbon/oxygen ratio at the time the pellets are formed and prior to charging to the smelting furnace. The utilization of pellets in an electric smelting furnace is itself not without problems for the reason that iron ore, limestone and carbon conglomerate mixtures of pellets which contain the proper amount of carbon with respect to the oxygen content of the conglomerate are frequently found to possess too low a crushing strength for convenient handling from a traveling grate system to an electric furnace smelting system. The amount of fines produced is excessive and introduces handling difficulties. However, pellets which contain an amount of carbon in excess of the desired amount for the proper carbon/oxygen ratio are found to possess an adequate crushing strength which avoids the problem of excessive amounts of fines and the problems of handling attendant the presence of such fines. Of course, excessive amounts of carbon are deleterious to the electric furnace smelting process as outlined above.

It has been found that these diametrically opposed problems can be solved very conveniently by producing a charge of pellets and corrective iron ore which is a composite of coarse iron ore particles and a relatively much finer particle size conglomerate mixture including iron ore, limestone and a source of carbon, such as coal, e.g., crushed bituminous coal. In one pelletizing procedure it is found that the relatively large particles of iron ore can conveniently be made to become nucleii about which is formed a pellet from the smaller particle size mixture of iron ore, limestone and coal, for example, the latter mixture having an amount of carbon contained therein which is excessive for the proper carbon/oxygen ratio. The excessive amount of carbon improves the overall strength of the pellet. The iron oxide nucleus, however, provides a sufficient amount of oxygen to the overall indurated charge such that the carbon/oxygen balance of the indurated charge composite is within the range which is desired for introduction into a smelting furnace and which minimizes the problem of accumulation of carbon within the furnace with the resultant rejection of the electrodes.

Alternatively, if the ore is sufficiently coarse, i.e., 1" average diameter, it may be added directly within the bed on the traveling grate along with high carbon pellets.

The invention may be better understood by reference to the annexed drawings wherein:

FIG. 1 is a schematic diagram illustrating an embodiment of this invention and showing the production of pellets in accordance herewith and the utilization of pellets in an electric arc smelting furnace.

FIG. 2 is a graph showing the pellet strength as a function of the carbon/oxygen ratio.

FIG. 3 is a graph showing pellet strength as a function of the percent of coal in the burden.

FIG. 4 is a graph representing the fines created from a drop test as a function of pellet strength.

FIG. 5 is a diagrammatic section of a greatly enlarged scale of a high carbon pellet containing a nucleus of iron ore of increased particle size relative to the balance of the pellet.

The process of making iron such as illustrated in FIG. 1 utilizes a composite charge of pellets made from coal or other carbonaceous materials, iron ore and slag material, usually limestone. These pellets are carbonized and prereduced on a traveling grate machine before subsequent smelting in a suitable furnace. During the carbonization process which involves heating the blend with a hot gaseous medium the iron ore becomes prereduced losing approximately 50% of its oxygen. Simultaneously, the limestone becomes precalcined losing approximately 80% of its carbon dioxide. Concurrently the coal or carbonaceous material becomes carbonized losing about 90% of its volatile matter. The carbonization process enables the pyrolytically decomposed carbonaceous material to form a char bond between the residual iron, iron oxides and slag materials. The char bond serves as a matrix for the pellet contributing to the physical strength characteristics thereof. The strength of this bond is largely dependent upon the quality of raw materials including the coal as well as the high temperature environment of the carbonizing process. As indicated, it has been found that pellets containing higher percentages of carbon form a carbonaceous material enabling higher strength pellets to be formed.

Although reference has been made to the problems attendant the excess of carbon including the buildup of carbon and its accumulation in the hearth of the smelter, thus interfering with the proper smelting reactions and temperatures, if there is a deficiency of carbon in the carbonized pellets, there will be a deficiency in the complete chemical reaction of converting oxide into pig iron. Iron remains in the unreduced state in the slag and thus be lost lowering the yield of metallic iron in the smelting processes. A deficiency of carbon is generally corrected by adding additional carbon to the furnace or decreasing the proportion of iron oxide.

Referring more particularly now to the schematic diagram of FIG. 1, the main blend is formed by proportioning iron ore, coal and limestone in a predetermined ratio designed to produce a proper slag, the amount of limestone being in a metallurgical ratio sufficient to balance the acid constituents of the blend. Sufficient coal is added to the main blend to account for about 80% of the anticipated requirement of coal for the entire process. The main blend is then ground in a wet circuit and filtered.

As shown, the proportional blend is milled in a suitable mill, such as a ball mill, and thereafter filtered. The filter cake may then be blended with corrective coal continually added in various amounts as dictated by specified carbon to oxygen ratios required for smelting and determined by analysis of carbonized pellets at the discharge end of the traveling grate machine.

Target material compositions and known ratios of carbon monoxide to carbon dioxide enable a proper carbon to oxygen ratio to be determined for any specification or burden. Generally, the carbon to oxygen ratio for the production of pig iron should be on the order of about 0.75 to 2.0 depending upon the required chemistry.

The composition is then pelletized in a suitable balling device. One such balling device is fully illustrated in United States Patent 3,169,269, dated Feb. 16, 1965.

An iron ore-solid carbonaceous material composition suitable for use herein will contain an excessive amount of carbon in relation to the other ingredients present in the conglomerate mixture which is ultimately to undergo smelting in a suitable furnace. Thus, the relative amount of gangue materials, the nature and content of the iron oxides, the nature and extent of the fluxing materials, and the processing procedures will influence the carbon/oxygen ratio in the final indurated product produced in accordance herewith. Those skilled in the art, are able, through experience with particular ores and fluxing materials or acquainted with the amount of carbon which will insure a predetermined amount available in the indurated charge, to make proper adjustment without dependence upon close analytical control exercised just prior to charging the material to the smelting furnace.

However, for exemplary purposes it will be convenient to illustrate formulations which may be used in producing the indurated charges of the present invention.

EXAMPLE I

Iron ore analyzing 65% Fe, powdered coal and limestone are mixed in the following proportions: iron ore, 63%; powdered coal, 26%; limestone, 11%.

This mixture is then ground in a conventional apparatus to a mesh size such that at least 80% of the ground mixture passes through 100 mesh and 50% to 60% passes through 325 mesh.

This product contains an excess of carbon over the theoretical amount which would produce a suitable carbon/oxygen ratio in an indurated product. In this instance, the carbon/oxygen ratio of an indurated sample is approximately 1.2. According to the teachings of this invention, the indurated product as a charge material has a carbon/oxygen ratio of 0.9.

EXAMPLE II

In this example, use is made of a low grade iron ore analyzing 48% Fe. On the dry basis, the iron ore is mixed with the following ingredients in the amounts indicated: iron ore, 55%; powdered coal, 26%; limestone, 19%.

As in the preceding example, these materials are ground together such that at least 80% of the ground mixture produced passes through 100 mesh and 50% to 60% passes through 325 mesh.

This product contains carbon in excess of an amount which an indurated product would produce a carbon/oxygen ratio of 0.85 which is desired. A sample indurated under the conditions set forth herein showed a carbon/oxygen ratio upon induration of 1.5. However, when treated with corrective coarse iron ore in accordance with the teachings of this invention, the excess carbon is compensated for by a stoichiometric amount of iron oxide necessary to substantially oxidize the excess carbon to oxides of carbon and produce an overall carbon/oxygen ratio of 0.85.

The ground blends, or conglomerates of finely divided material are pelletized in accordance with the procedures set forth above.

EXAMPLE III

In this case, the iron ore analyzed about 68% iron. The dry ingredients were mixed in proportion as follows: iron ore, 60 parts; powdered coal, 30 parts; limestone, 10 parts.

This composition was ground in the manner set forth above to substantially the same degree of fineness as set forth above. This product had an excess of carbon which on induration amounted to approximately 1.3 as a ratio for carbon-oxygen. Upon treatment in accordance herewith the amount of corrective iron ore added was such that upon induration the resultant charge material had a carbon/oxygen ratio of 0.90.

It should be pointed out that instead of coal there may be used for this purpose powdered coke, coke breeze, anthracite coal, lignite, or the like. The solid carbonaceous material is desirably pulverized to the same fineness as the iron ore although it may be as coarse as 65 mesh. The fluxing material is pulverized to within the same particle range as the ore, i.e., from 65 mesh to 400 mesh.

Corrective coarse iron ore having a particle size at least 80% of which is in the range of from ⅛" to 1" in diameter is added at this point in response to analysis of the carbon/oxygen ratio in the indurated burden and the strength of the pellets desired. Instead of preceding the pellet formation, such corrective ore may be added directly to the bed prior to entry into the carbonizing operation.

A mixture such as this is fed to such an inclined rotating, balling pan as above described, and there may desirably be simultaneously fed thereto coarse raw ore having a particle size desirably in this case in the range from about two to four mesh. As indicated above, when introduced prior to pelletizing, the large particle size iron ore provides a nucleus about which the ore-carbon-limestone mixture is deposited until the ultimate particle size desired for admission to the traveling grate is obtained. Usually, the green pellet average particle size is quite uniform and in the range of ⅜" to 1.5" in diameter. Moisture is added to the composition as it enters the balling pan, and by controlling the rate of rotation of the pan, the total moisture content (since there may be moisture in the raw ingredients) and the angle of inclination of the pan, the particle size of the pellets can be easily controlled and rendered remarkably uniform. Firm discrete "green" pellets are formed at a total moisture content from about 8% to about 15% water.

The terms "green pellets" or "green balls" as used here in reference to the fact that the balls or pellets have not been dried or indurated, and identifies their moist condition upon leaving the balling apparatus.

The "green pellets" are discharged from the balling apparatus and conveyed by conventional means to a conventional traveling grate machine. As schematically shown in FIG. 1, the green pellets undergo drying in a first zone where substantially inert gases, preferably slightly reducing, and at a temperature at a range from about 300° F. to 600° F. are passed downwardly through the burden. A fan coacting with the windbox directly below the drying zone hood exhausts the moisture laden gases.

The burden then travels into a carbonizing and prereducing zone where the incoming gases have a temperature in the range of from about 1,000° F. to about 2,000° F. and preferably about 1800° F. A separate fan coacting with the windbox adjacent the carbonizing zone collects the gases from this zone and recycles them for repassage through the drying and carbonizing zones in the circular manner. Instead of discharging these gases to the atmosphere, the gases contain a substantial amount of hydrocarbon and carbon monoxide which may be utilized to impart heat to the gases prior to recycling them through the burden. After-burner means may be included in the gas stream to increase the temperature of the gases to a desired level and also to rid the gas stream of tars which otherwise tend to accumulate in the fans necessitating shut-down to clean out this apparatus.

The pellets may enter a heat soaking or a post-heating zone where the incoming gases have a temperature in the range of 2,000° F. to 2,400° F. although this step is not necessary. Fan means coacting with the windbox adjacent the post-heating zone serves to propel the gases upward through the burden in the post-heating zone.

The gases traverse the bed in the drying zone at the rate of from about 200 to 400 standard cubic feet per minute per square foot of bed area, hereafter identified as "s.c.f.m." The residence time in the drying zone may be from 8 to 15 minutes. The gases are passed through the burden at a rate of from about 150 to 250 s.c.f.m. in the carbonizing zone, and the residence time in this zone is also from 8 to 15 minutes.

If a cooling zone is employed, and it is not necessary so to do, an up-draft of cool inert gas at the rate of 50 to 300 s.c.f.m. may be used. Where the pellets are to be discharged directly into a smelting furnace such as shown in FIG. 1, the cooling operation may be omitted, and a final up-draft post-heating operation performed instead. Introduction of gases from below reverses the direction of the temperature gradient or "flame front" traversing the burden diagonally downwardly and forwardly and sends it upwardly away from the grates and forwardly thus better distributing the heat level through the burden.

The pellets on the traveling grate machine useful in the present invention have a width ranging from 18" to 144" and move along the traveling grate machine bed at variable rates in order to accommodate retention times for the given composition being treated. A typical total retention time for a Taconite ore such as given above would be approximately 30 minutes, 15 minutes in each zone. The rate of flow of the gases through the bed in the drying and carbonizing zones is not critical, and for the process of the present invention the rate of flow of the gases should be desirably controlled to be within the range of from about 50 to 200 s.c.f.m. per square foot of grate area.

Submission of the burden to the conditions above outlined, is carried on until the high temperature gases cause the bed to be relatively uniformly heated to a temperature of about 2,000° F. At this temperature the pellets lose oxygen, hydrocarbon and carbon-dioxide and discharge as a self-fluxing and self-reducing charge. Any convenient process for producing carbonized and prereduced or metallized pellets may be used in preparing the charge compositions in accordance herewith. Reference may be had to U.S. Patent No. 3,304,168 for an exemplary process.

Smelting of the carbonized and prereduced pellets is conveniently accomplished through continuous charging of the pellets from the traveling grate machine to a submerged arc electric furnace. Within the furnace, the residuals of iron oxide and silicon react with the remaining carbon, and the limestone reacts with the acid constituents of the burden to provide both liquid pig iron and liquid slag, and gaseous products, carbon monoxide and carbon dioxide.

Surplus carbon within the carbonized pellet increases the strength due to the contribution of additional bonding agent. A fairly slight increase in the carbon content or the carbon/oxygen ratio has a powerful effect on the resulting crushing strength of the carbonized pellets.

The graph shown in FIG. 2 illustrates a remarkable improvement in crushing strength by a slight increase in the carbon/oxygen ratio. For instance, a 40% increase in the carbon/oxygen ratio causes a 100% increase in the carbonized pellet strength. Generally, the increase of the carbon/oxygen ratio is brought about by increasing the percentage of coal within the burden. Therefore, a relationship exists between the coal within the burden and the resulting strength of the carbonized pellets as shown in FIG. 3 where a 100% increase in strength is caused by an increase of 2% or 3% of coal within the burden.

As indicated above, strong carbonized pellets are desirable for charging to the furnace because they do not readily break down into fines which are troublesome in an electric furnace which depends upon a gas-solid reaction. Such strong pellets do not give rise to fines when submitted to a screening bed thereby minimizing the amount of undersized material. The pellets are ordinarily screened before charging to the electric furnace. The effect of pellet strength on the amount of fines created on impact is shown in FIG. 4.

For smelting, the requisite oxygen ratio is generally from 0.75 to 1.1 and usually 0.85. In an electric smelting furnace, where no carbon is consumed by forced air or oxygen draft, then the ratios are from 0.75 to 1.1. When it is desired to use these pellets in a draft furnace, e.g., a blast furnace or a hot blast cupola, the higher carbon content pellets are desired having on the order of 0.85 to 2.0 as a carbon/oxygen ratio. Desired pellet strength is obtained at a carbon/oxygen ratio in the pellet of 1.1 or above. The addition of iron oxide to account for the increased carbon may be done prior to smelting in different ways. Coarse ore, having a particle size at least 80% of which is in the range of 1/8" to 1" in diameter may be added within the bed of green high carbon pellets charged to the traveling grate machine. The preferred method is as coarse ore mixed with the high carbon feed blend as charged to the balling apparatus wherein the coarse ore instead of being fed to a furnace forms a seed or nucleus of a green pellet as shown diagrammatically in FIG. 5.

When a blend of minus 1 mesh filter cake and coarse ore of 1/8" to 1/2" structure are added to the rotating balling disc, there is an immediate segregation causing the coarse ore to trickle through the tumbling pellet bed and acquire an immediate coating of the fine high carbon, moist filter cake blend. This is a phenomenon of nucleation that takes place within a balling pan whereby the nucleus becomes enlarged when plated with filter cake and ultimately grows into a large pellet with a diameter of .75" to 1.5". By this phenomenon green pellets are readily formed with a seed or nucleus of coarse ore particles and the actual layers of mantle or crust are comprised of high carbon pellet mix. When such pellets become carbonized the entire structure as illustrated in FIG. 5 results and is comprised of a very strong mantle or shell of high carbon blend and a nucleus of a coarse ore particle which has undergone pyrolytic treatment in a reducing atmosphere and thus has become substantially preheated and prereduced. Such composite pellets formed of a nucleus of iron ore containing 15% to 30% oxygen balances the surplus carbon of the high carbon-oxygen ratio of the remaining constituents of the pellet. This then provides a completely satisfied carbon/oxygen ratio on the order of 0.85 for the carbonized pellet with a crushing strength which has been improved by a factor of at least 100%, and provides a preferred and accurate method for compensating for excess carbon externally of the smelting apparatus.

What is claimed is:

1. A process for making a carbonized and prereduced iron ore smelting furnace charge composition having a predetermined overall carbon to oxygen ratio in the range of from 0.75 to about 1.1 and including in pellet form an iron ore-carbon blend having a carbon to oxygen ratio in excess of said predetermined ratio which comprises the steps of:
    (a) forming a blend including finely divided iron ore and relatively finely divided solid carbonaceous material in which the ratio of carbon to oxygen is greater than said predetermined value, the particle sizes of a said iron ore and said carbonaceous material each being within the range of from 65 mesh to 400 mesh;
    (b) moistening said blend to a total moisture content of from about 8% to about 15% by weight of the mass with water.
    (c) forming said blend into discrete moist pellets having an average particle size of from 3/8" to 1.5" in diameter.
    (d) including with said pellets corrective coarse iron ore having a particle size substantially all of which is in the range of from 1/8" to 1" in diameter; and
    (e) indurating said charge to carbonize and prereduce said iron ore pellets, whereby the overall carbon to oxygen ratio in said indurated charge is in the range of from 0.75 to 1.1.

2. A process in accordance with claim 1 in which the corrective coarse iron ore is included with the blend prior to forming the blend into pellets.

3. A process in accordance with claim 1 in which the corrective coarse iron ore is included with the blend after forming the blend into pellets but before indurating the charge.

2. A process in accordance with claim 1 in which the blend of iron ore and solid carbonaceous material additionally includes limestone having a particle size at least 80% of which is in the range of 65 mesh to 400 mesh.

References Cited

UNITED STATES PATENTS

| | | | |
|---|---|---|---|
| 2,356,024 | 8/1954 | Andersen et al. | 75—5 |
| 2,806,779 | 9/1957 | Case | 75—33 |
| 3,033,673 | 5/1962 | Collin et al. | 75—11 X |
| 3,140,169 | 7/1964 | Smith et al. | 75—33 |
| 3,332,770 | 7/1967 | Wendt et al. | 75—5 |

OSCAR R. VERTIZ, Primary Examiner

G. O. PETERS, Assistant Examiner

U.S. Cl. X.R.

75—5, 11